(12) United States Patent
Lal

(10) Patent No.: US 7,689,667 B2
(45) Date of Patent: Mar. 30, 2010

(54) PROTOCOL TO FIX BROKEN LINKS ON THE WORLD WIDE WEB

(75) Inventor: Amrish K. Lal, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1133 days.

(21) Appl. No.: 10/078,419

(22) Filed: Feb. 21, 2002

(65) Prior Publication Data

US 2003/0158953 A1   Aug. 21, 2003

(51) Int. Cl.
*G06F 15/16* (2006.01)
*G06F 17/00* (2006.01)

(52) U.S. Cl. .................................. 709/218; 715/208
(58) Field of Classification Search .................. 709/218; 715/205, 208
See application file for complete search history.

(56) References Cited

U.S. PATENT DOCUMENTS

| | | | |
|---|---|---|---|
| 5,745,360 A | | 4/1998 | Leone et al. |
| 5,751,956 A | | 5/1998 | Kirsch |
| 5,761,683 A | * | 6/1998 | Logan et al. ............... 715/206 |
| 5,794,257 A | * | 8/1998 | Liu et al. ................... 715/501.1 |
| 5,856,974 A | * | 1/1999 | Gervais et al. .............. 370/392 |
| 5,870,559 A | | 2/1999 | Leshem et al. |
| 5,898,836 A | * | 4/1999 | Freivald et al. ............. 709/218 |
| 5,907,680 A | | 5/1999 | Nielsen |
| 5,941,944 A | | 8/1999 | Messerly |
| 5,958,008 A | * | 9/1999 | Pogrebisky et al. ......... 709/223 |
| 5,974,572 A | | 10/1999 | Weinberg et al. |
| 5,978,842 A | * | 11/1999 | Noble et al. ................ 709/218 |
| 5,983,268 A | * | 11/1999 | Freivald et al. ............. 709/218 |
| 5,999,929 A | | 12/1999 | Goodman |
| 6,012,087 A | * | 1/2000 | Freivald et al. ............. 709/218 |
| 6,021,439 A | | 2/2000 | Turek et al. |

(Continued)

FOREIGN PATENT DOCUMENTS

JP   59226955 A   * 12/1984

(Continued)

OTHER PUBLICATIONS

Automatic link generation and repair mechanism for document management, Shimada et al., System Sciences, Proceedings of the Thirty-First Hawaii International Conference, Jan. 6-9, 1998 vol. 2, pp. 226-235.*

(Continued)

*Primary Examiner*—Ajay Bhatia
(74) *Attorney, Agent, or Firm*—Sughrue Mion, PLLC

(57) ABSTRACT

A protocol for automatically fixing broken hypertext links is described that can save countless hours wasted by World-Wide Web surfers trying to navigate using a broken link or web authors trying to fix broken links to their web pages. A link correction service checks hypertext links in a document by sending messages according to a hyperlink verification protocol (HLVP) to a remote web server indicated by the link. A link checking service at the remote web server, in response to receiving an HLVP message for a link, consults a mapping table to determine if the link is valid, has changed, has been removed, or is unknown. A response code indicating the status of the link is returned to the link correction service to modify the page accordingly.

29 Claims, 6 Drawing Sheets

U.S. PATENT DOCUMENTS

| | | | | |
|---|---|---|---|---|
| 6,035,330 | A | * | 3/2000 | Astiz et al. ............. 709/218 |
| 6,049,799 | A | | 4/2000 | Mangat et al. |
| 6,112,203 | A | | 8/2000 | Bharat et al. |
| 6,138,157 | A | | 10/2000 | Welter et al. |
| 6,163,778 | A | | 12/2000 | Fogg et al. |
| 6,212,536 | B1 | | 4/2001 | Klassen et al. |
| 6,219,818 | B1 | * | 4/2001 | Freivald et al. ............. 714/799 |
| 6,253,204 | B1 | * | 6/2001 | Glass et al. ............. 707/102 |
| 6,449,615 | B1 | * | 9/2002 | Liu et al. ............. 707/10 |
| 6,578,078 | B1 | * | 6/2003 | Smith et al. ............. 709/224 |
| 6,598,051 | B1 | * | 7/2003 | Wiener et al. ............. 707/100 |
| 6,601,066 | B1 | * | 7/2003 | Davis-Hall ............. 707/5 |
| 6,606,653 | B1 | * | 8/2003 | Ackermann et al. ............. 709/219 |
| 6,650,348 | B2 | * | 11/2003 | Mariani et al. ............. 715/853 |
| 6,658,402 | B1 | * | 12/2003 | Dutta ............. 707/2 |
| 6,782,430 | B1 | * | 8/2004 | Cragun ............. 709/245 |
| 6,785,864 | B1 | * | 8/2004 | Te et al. ............. 715/501.1 |
| 6,823,379 | B1 | * | 11/2004 | Heckel et al. ............. 709/224 |
| 7,216,256 | B2 | * | 5/2007 | Sankaran et al. ............. 714/27 |
| 7,290,205 | B2 | * | 10/2007 | Moncsko et al. ............. 715/208 |
| 7,363,364 | B2 | * | 4/2008 | Sankaran et al. ............. 709/223 |
| 7,392,303 | B2 | * | 6/2008 | Smith et al. ............. 709/223 |
| 2002/0013825 | A1 | * | 1/2002 | Freivald et al. ............. 709/218 |
| 2002/0143932 | A1 | * | 10/2002 | Quintero et al. ............. 709/224 |
| 2002/0169865 | A1 | * | 11/2002 | Tarnoff ............. 709/223 |
| 2003/0004978 | A1 | * | 1/2003 | Greenbaum ............. 707/202 |
| 2003/0065739 | A1 | * | 4/2003 | Shnier ............. 709/217 |
| 2004/0024848 | A1 | * | 2/2004 | Smith et al. ............. 709/219 |
| 2004/0107267 | A1 | * | 6/2004 | Donker et al. ............. 709/218 |
| 2004/0205076 | A1 | * | 10/2004 | Huang et al. ............. 707/100 |
| 2004/0205557 | A1 | * | 10/2004 | Bahrs et al. ............. 715/513 |
| 2004/0243544 | A1 | * | 12/2004 | Hipp ............. 707/1 |

FOREIGN PATENT DOCUMENTS

| | | | |
|---|---|---|---|
| JP | 11015851 | | 1/1999 |
| JP | 2000315170 | | 11/2000 |
| JP | 2001014208 | | 1/2001 |
| WO | WO00/46696 | * | 8/2000 |

OTHER PUBLICATIONS

Hypertext Link Integrity, Hugh C. Davis, 2000 ACM.*
Fixing the "Broken-link" Problem: The W3Objects Approach, D. B. Ingham, S. J. Caughey and M. C. Little, 1997.*
Referential Integrity of Links in Open Hypermedia Systems, Hugh C. Davis, 1998.*
Creech, M. L. 1996. Author-oriented link management. Comput. Netw. ISDN Syst. 28, (May 7-11, 1996), 1015-1025.*
Ingham et al., "Fixing the Broken Link Problem", Computer Networks and ISDN Systems Conference Title, May 1996, vol. 28, No. 7-11, p. 1255-68.
Davis, "Referential Integrity of Links in Open Hypermedia Systems", HyperText 98: $9^{th}$ ACM Conference on HyperText and Hypermedia, p. 207-16.
Schwartz, "Step-By-Step Link Verification", Web Techniques, vol. 4, No. 3, Mar. 1999, p. 30, 32-4.
Schwartz, "Programming with Perl: Web Wandering for Broken Links", Web Techniques, Oct. 1996, vol. 1, No. 7, p. 20, 22-3.
Alward et al, "Router Automatic Link Re-Establishment Process", IBM TDB, vol. 36, No. 7, Jul. 1993, p. 113-116.
Hsu et al, "Bookmark Maintenance Tool", IBM TDB vol. 41, No. 13, Sep. 1998, Article 41389.
Jakob Nielsen's Alertbox, Mar. 21, 1999, "URL as UI", http://www.useit.com.alertbox/990321.html, p. 1-3, Mar. 1999.
Jakob Nielsen's Alertbox, Jun. 14, 1998, "Fighting Linkrot", http://www.useit.com.alertbox/980614.html, p. 1-2, Jun. 1998.
Delong, "Sitesweeper Simplifies Web Management", p. 1, Jan. 1999.
Sitesweeper: Software Helps Webmasters Diagnose Web Site Problems, PC Today, Feb. 1997, vol. 11, Issue 2.
W3C Style, Cool URIs don't change, http://www.w3.org/Provider/Style/URI, 1998, p. 1-8.

* cited by examiner

| OLD URL | URL STATUS | NEW URL |
|---|---|---|
| HTTP://WWW.COMPANY-NAME.COM/REMOVED.HTML | -1 | |
| HTTP://WWW.COMPANY-NAME.COM/INDEX.HTML | 0 | |
| HTTP://WWW.COMPANY-NAME.COM/MOVED.HTML | 1 | HTTP://WWW-3.COMPANY-NAME.COM/MOVED.HTML |
| HTTP://WWW.COMPANY-NAME.COM/SOME.JPG | 1 | HTTP://WWW-5.COMPANY-NAME.COM/IMAGES/SOME.JPG |
| HTTP://WWW.COMPANY-NAME.COM/ANOTHER.JPG | -1 | |
| ... | ... | ... |

FIG.3

PROTOCOL TO FIX BROKEN LINKS ON THE WORLD WIDE WEB

BACKGROUND OF THE INVENTION

1. Field of the Invention

The invention relates to client-server data communication systems. More particularly, it relates to repairing links between pages in a client-server network.

2. Description of the Related Art

The Internet, as it is popularly known, has become an important and useful tool for accessing a wide variety of information. One component of the Internet is the World Wide Web (hereinafter the web). In recent years the web has become an increasing popular vehicle for providing information to virtually anyone with access to the Internet. Many websites have been established to provide, over the web, information in many different forms, such as text, graphics, video and audio information.

A typical website is hosted on a network server computer that includes application software programs. The server, also known as a web server, is connected to the Internet. By connecting the web server to the Internet, clients that are connected to the Internet can access the website via the web server. Usually, a client is located remotely from the web server, although the client and the server can be at the same location. A web server also can be connected to a private intranet, as opposed to or in addition to the public Internet, in order to make a website privately available to clients within an organization.

A client-server communication system used on the web is shown on FIG. 1. The system includes a client 2 that is connected to a monitor 4 and to a network 6, such as the Internet. The client sends and receives messages over the network 6 to a server, such as web server 8, web server 10, or web server 12 shown in FIG. 1. The web servers host web sites that include one or more web pages. For example, web server 8 hosts web site 13 that contains a series of web pages 14a through 14n. Similarly, web server 10 hosts web site 15 that contains a series of pages 16a through 16n, and web server 12 hosts web site 17 that contains a series of pages 18a through 18n. A uniform resource locator (URL) is a string that gives information about the location of a particular resource (such as a file, image, or program) on the Internet. Generally, each web page has a unique URL.

The client 2 accesses web pages on a website by using a web browser 20; that is, a software program that runs on the client and receives from the server information formatted in a known manner. A very popular format for information sent over the web from a server to a client is the Hyper Text Mark-up Language (HTML).

A web server typically takes user input, in the form of a URL, and returns the file(s) that correspond to that web page. This process begins by the client browser sending a request to a web server indicated by the URL. Once the web server receives the client request, it locates the file, or executes the program, specified by the URL and sends the file back to the client browser. The file(s) making up the web page that has been delivered to the client is held in a cache memory for use by the browser 20. Web page 22 shown in FIG. 1 represents a web page that is stored in the browser's cache. The browser interprets the HTML code in the web page to generate a display 24 on monitor 4. If the web server encounters a problem while processing the client browser's request, it returns an error code.

One web page on the Internet can reference another web page on the Internet through the use of URL links. These links are basically URL strings contained within special HTML tags. When the user clicks on such a link the client browser requests from a web server the resource specified by the URL and displays that resource, such as an HTML web page file, on the client browser. Here, for purposes of illustration, referring to FIG. 1, assume the web page 22 held in the browser's cache and displayed as page 24 came from web site 13 in web server 8. The web page display 24 includes two hypertext links to other web pages held on different severs. URL link B ("link B") 26 contains the URL of web page 16a stored in web server 10. URL link C ("link C") 28 contains the URL of web page 18a stored in web server 12. If a user selects link B 26, the browser sends a message to the web server 10 to return the web page corresponding to the URL of link B. Here, web server 10 returns an HTML copy of web page 16a to client 2. Similarly, if a user selects link C 28, the browser sends a message to the web server 12 to return the web page corresponding to the URL of link C. Here, web server 12 returns an HTML copy of web page 18a to client 2.

A commonly encountered problem with many web pages is that the hypertext links on those pages might become stale, or broken, such that the URL within the hypertext link no longer refers to the location of a web page. The problem of broken links, also known as linkrot, occurs commonly on sites and pages throughout the web. Web surfers find broken links to be annoying and usually tend to avoid sites that have many broken links. For web page authors, fixing broken links can be tedious and labor intensive.

A URL link can be considered to be broken when, for example

1. The file specified by the URL has been renamed in the web server.

2. The file specified by the URL has been deleted in the web server.

3. The location of the file under the web browser is changed.

Under any one of these circumstances the web server returns an error message (e.g., error code 404) back to the client browser.

Broken links are very annoying to the users and are quite common on the World Wide Web. A 1997 World Wide Web user survey rated broken links to be the most frequent problem encountered by users.

Fixing broken links is a significant inconvenience for web developers. It is a task that is carried out manually, and hence, is labor intensive and time consuming. Despite the fact that broken links are regarded as one of the most serious problems on the World Wide web, no definitive solutions that solve the problems once and for all has yet been developed.

Proposed solutions to date are difficult to implement and do not operate automatically. One such solution recommends web developers follow rules, set forth below, to prevent broken links.

1. Check the web page links frequently and fix them to reduce outbound linkrot.

2. Keep old pages on the server forever and if moving pages place a redirect link on the old page.

Web developers often either are not aware of such rules or simply do not follow them, as illustrated by the large number of broken links on the World Wide Web. Accordingly, there is a long felt but as of yet unsolved need to automatically detect and fix broken links.

SUMMARY OF THE INVENTION

Therefore, in light of the above, and for other reasons that will become apparent when the invention is fully described, an object of the invention is to automatically fix broken links on web pages.

Another object of the invention is to automatically detect broken hypertext links.

A further object of the invention is to correct hypertext links in documents without requiring modifications to client software.

Yet another object of the invention is to enable a service for automatically detecting and correcting hypertext links embedded in documents on a web site.

A still further object of the invention is to provide a protocol for detecting, and correcting or removing broken hypertext links.

The aforesaid objects are achieved individually and in combination, and it is not intended that the invention be construed as requiring two or more of the objects to be combined unless expressly required by the claims attached hereto.

In accordance with the invention, a protocol is described here that can be used to fix broken links automatically, thereby saving countless hours wasted by web surfers trying to navigate using a broken link or web authors trying to fix broken links to their web pages.

The above and still further objects, features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 3 illustrates a link mapping table.

DETAILED DESCRIPTION

Figure 1:
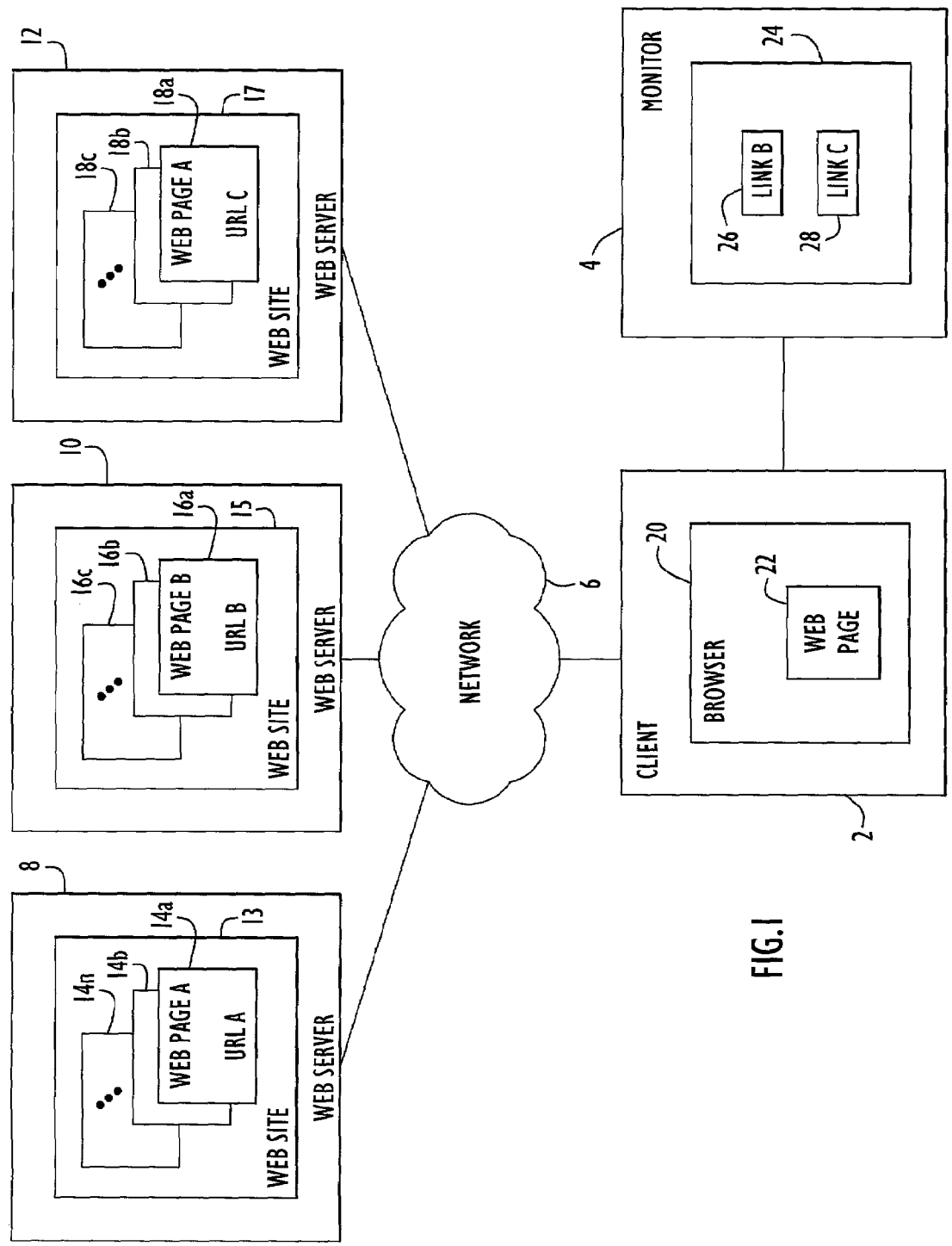
FIG. 1 is a diagram of a client-server network system.

The embodiments described below are described with reference to the above drawings, in which like reference numerals designate like components.

A solution to the problems associated with fixing broken web links can be based in a web server that operates automatically to correct or remove broken links. One aspect of the solution checks hypertext links in a web page to determine whether or not those links are broken. If they are broken then the web page is automatically corrected so that the link refers to the correct URL, or the link is removed. As described in more detail below, checking for broken links and fixing them can be accomplished by including the following extensions to a web server, without the need to modify any clients, although using such extensions in a client is not precluded.

1. A mapping table that maps a new URL to the old URL.
2. A hyperlink validation protocol (HLVP).
3. A link correction service.

A local server, such as a web host that hosts one or more web sites, can include a link correction service that performs link correction on web pages, or other types of documents that have broken URLs in those sites. The link correction service operates to correct broken hypertext links in the document and produce a corrected, or fixed document to use with the web site. The link correction service employs a new protocol that is described in more detail below for validating hyperlinks in a document. Based on a URL in the hypertext link, the link correction service identifies a remote web server that is referred to by the URL in the document. The link correction service uses the link verification protocol to request the remote web server to validate the link. The link correction service can reside in the web server that is attempting to the fix broken links in the documents that it manages, or alternatively the service can reside in a client.

Figure 2:
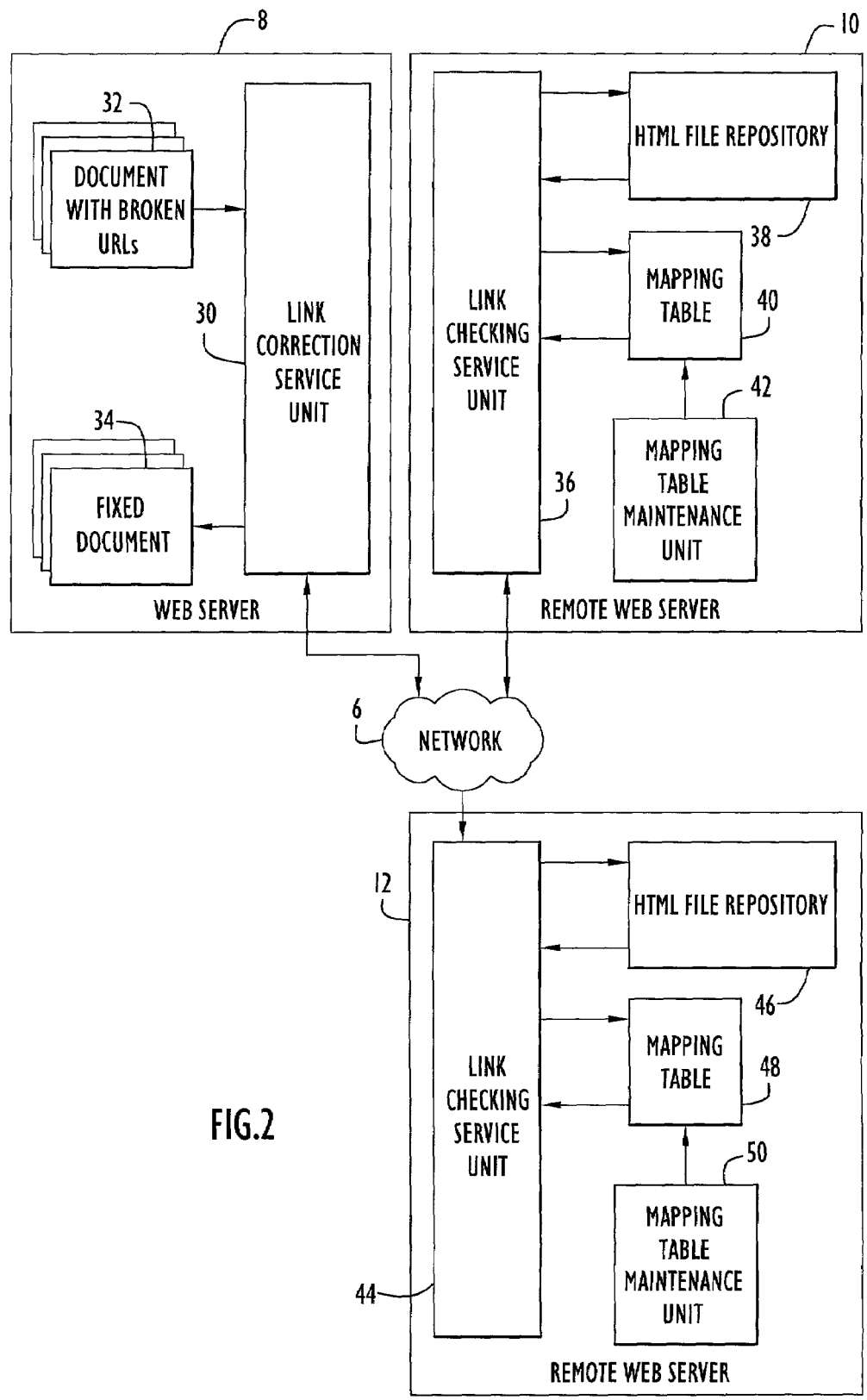
FIG. 2 shows a client-server network system with link checking and link correction services.

A client-server network system that performs link checking and link correction services is illustrated in FIG. 2. Referring to FIG. 2, a web server 8 includes a link correction service unit 30 that performs link correction on web pages or other types of documents. The box labeled 32 in FIG. 2 represents one or more documents that contain hyperlinks or URLs pointing to various resources that may be present on one or more remote web servers. For purposes of illustration here, it is assumed that many of the hyperlinks in document 32 are broken. The link correction service unit 30 operates to read and parse the document 32, and then fix or remove any of the broken hyperlinks found in that document. The link correction service unit 30 upon fixing or removing the broken hyperlinks, generates a modified form of document 32 where the modifications can include: 1) either broken links being replaced by fixed links, or 2) broken links being removed from the document. The document modified to correct or remove broken links is shown as the box labeled 34 in FIG. 2.

A link checking service informs the link correction service whether a hyperlink that points to the web server where the link checking service resides is: 1) valid, 2) no longer exists, 3) has been replaced by an alternate URL, or 4) has an unknown status. The link checking service typically operates on another web server that, generally, is remote from the web server running the link correction service, although they can reside on the same server. A remote web server, such as web server 10 shown in FIG. 2, includes a link checking service unit 36 that checks the validity of a link based on a request from the link correction service unit 30. Within the remote web server are a set of documents that are managed by web server 10. Often such documents are in HTML form, and accordingly, box 38 in FIG. 2 is labeled HTML file repository, although documents in other formats can reside in repository 38. The remote web server 10 also includes a mapping table 40 for mapping old URLs to new URLs, and a mapping tale maintenance unit 42 for maintaining the mapping table.

The mapping table 40 lists the changes that occur in the URL of the resources that the web server exposes to the outside world. A change in the URL of a resource has a corresponding entry in the mapping table. An example of such a mapping table is shown in FIG. 3. Here, the mapping table 52 includes the old URLs, listed in column 54; codes indicating the status of the URL, listed in column 56; and the new URLs corresponding to the changed locations, listed in column 58. The mapping table can be stored either in a file, in a database, or in any other suitable form that allows access to and use of the mapping table. The table can be generated and updated manually by a webmaster or through the use of a software utility program running in the mapping table maintenance unit 42. The mapping table maintenance unit 42 can operate with other software programs that determine an alternate URL for a given URL, to automatically update the mapping table.

In the mapping table 52, shown in FIG. 3, five rows 59a-59e are shown corresponding to five files that are stored, or were previously stored, in remote web server 10. For example, row 59a of the mapping table indicates that the file having a URL http://www.company-name.com/removed.html has been removed since it has a URL status code of "−1". Row 59b indicates that the file with URL http://www.company-name.com/index.html still resides where the URL indicates it can be located, and accordingly, has a URL status code of "0". Row 59c indicates that the file with URL http://www.company-name.com/moved.html has moved to a new location since its URL status code is "1". Row 59c also indicates the new URL for the file, namely, the URL http://www-3.company-name.com/moved.html.

Other remote web servers, such as web server 12 shown in FIG. 2, can include a link checking service. Those other web servers, such as web server 12, include a link checking service unit 44, an HTML file repository 46, a mapping table 48 and a mapping table maintenance unit 50.

Figure 4A:
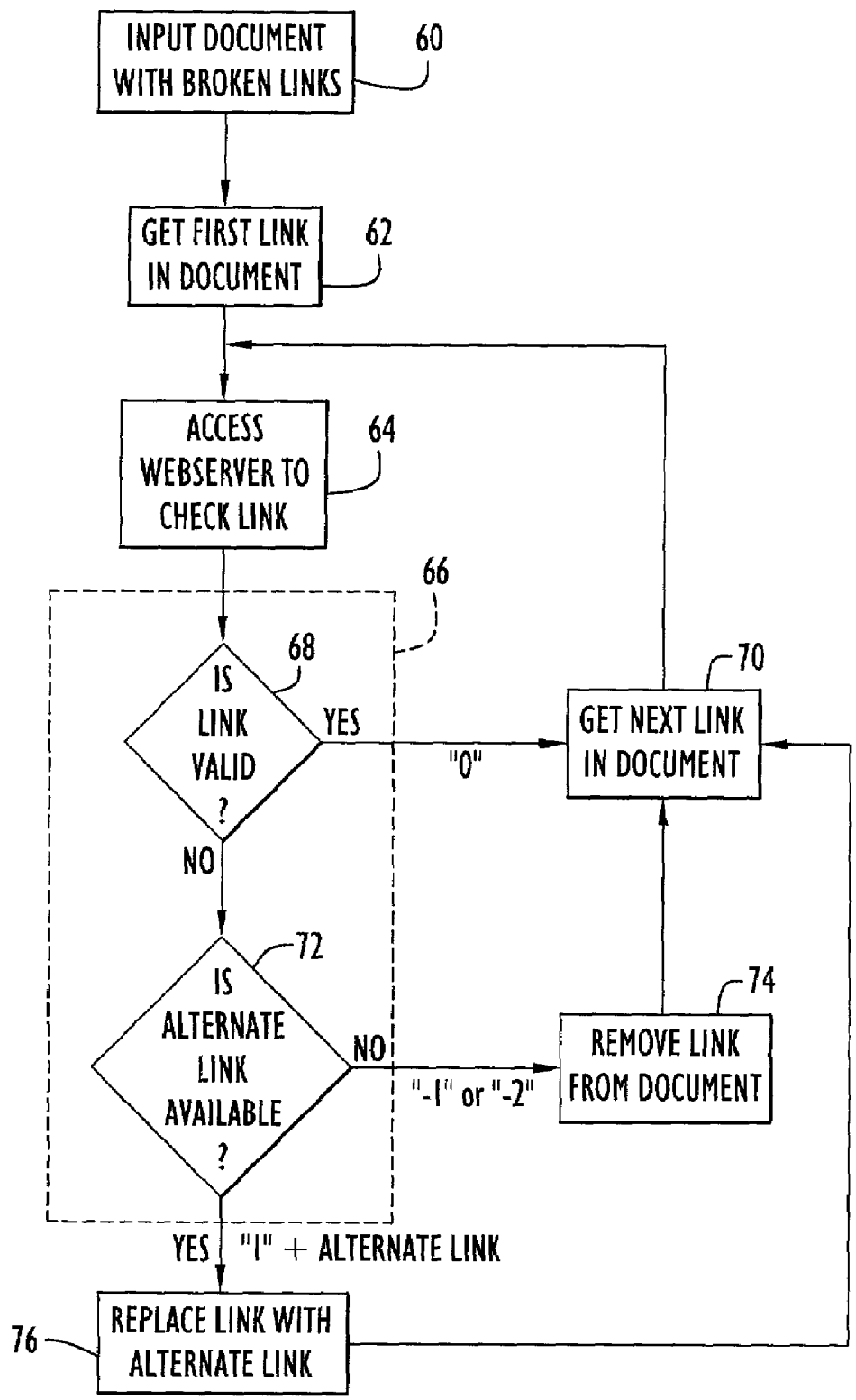
FIGS. 4A and 4B are flow diagrams for describing link correction and link checking services.

The link correction and checking services preferably are implemented in software with program instructions being executed on a computer to operate as described below with reference to FIGS. 4A and 4B. Referring to FIG. 4A, the link correction service unit operates by reading a document that may possibly contain one or more broken links 60. The link correction service unit checks each of the hyperlinks found in the document one by one. Upon inputting the document, the hyperlink correction service parses that document to obtain the first hyperlink or URL to be checked 62. For each hyperlink or URL in document A, the link correction service unit accesses the web server indicated by the URL and sends a request to the link checking service unit in that server to determine if the link is valid 64. Operations performed by the link checking service are illustrated in FIG. 4A within box 66.

In response to the link checking service unit at the remote server receiving the request for validating a link, it checks if the link is valid by determining if the document pointed to by the URL is actually present among the documents managed by its web server 68. If the document is found to be present, then the link checking service returns the code "0" to the link validation service unit, indicating that the link is valid. The link correction service unit then obtains the next link in the document to be checked 70, and then checks that next link in a similar manner. If the document is not found among the documents managed by the web server, the link checking service unit uses the mapping table to determine if an alternate link is available 72. If no alternate link is available a code "−1" is returned and if the link cannot be found in the mapping table a code "−2" is returned. Upon receiving either of those codes the link correction service unit removes the link from the document 74 and obtains the next link in the document to check 70. If an alternate link is available, the link checking service unit returns a code "1" and the URL of the alternate link. The link correction service unit modifies the document to replace the broken link with the alternate link 76 and then obtains the next link in the document to check 70.

Figure 4B:
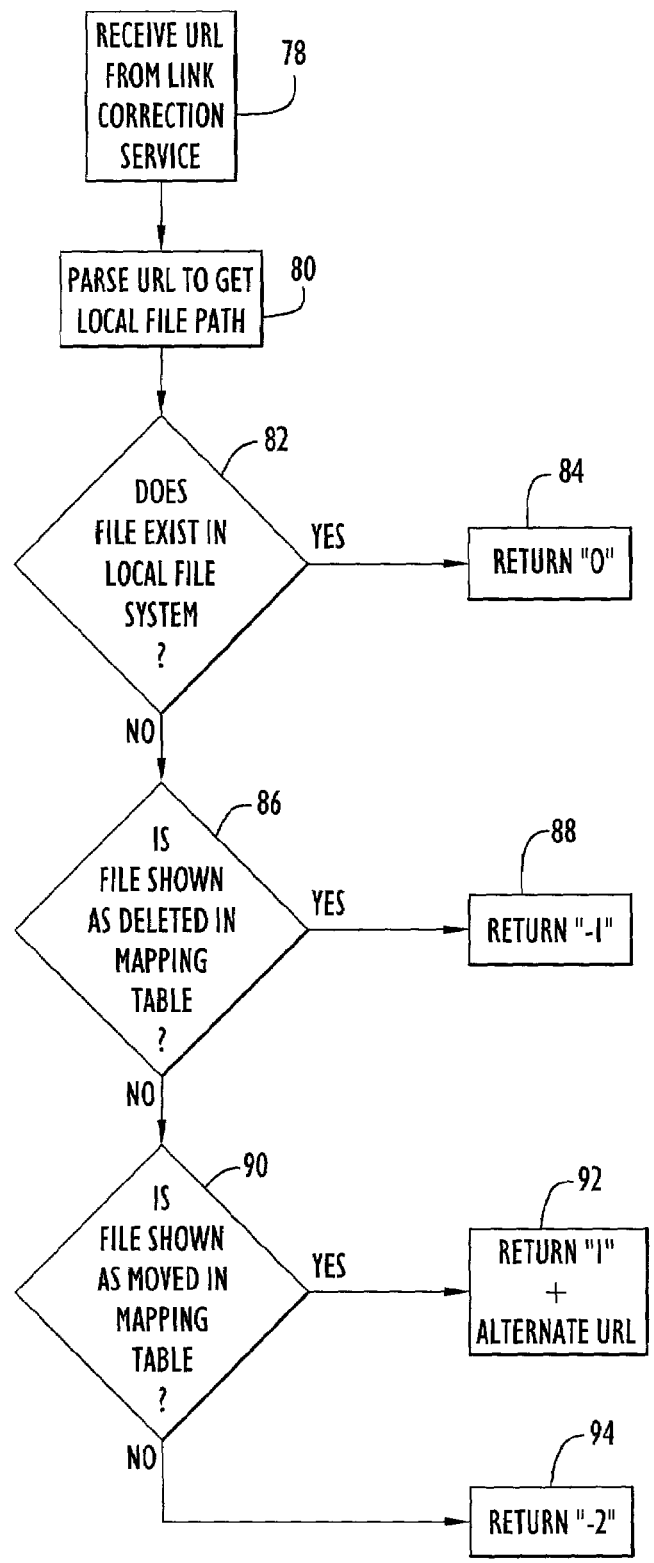

FIG. 4B illustrates a process performed by the link checking service in the remote web server. The process begins by the remote web server receiving a URL to check from a link correction service unit 78. The link checking service unit parses the URL to determine the local path within the remote web server 80, and determines if a file corresponding to that URL exists in the remote web server 82. The link checking service unit can consult the mapping table to determine if the requested URL is listed in the mapping table with an indication that the URL is valid. Alternatively, the link checking service unit can determine through the remote web server's file system if a path to the requested file exists, and hence, the URL is valid. If the URL is valid, a return code "0" is returned to the link correction service 84.

If the URL does not correspond to a file that is found among the documents managed by the remote web server, the link checking service consults the mapping table to determine if an alternate URL is available for the hyperlink. A mapping table can show the status of a URL to be valid (status code "0"), or as being permanently removed (status code "−1"), or it can show a new or alternate URL for the URL that the link checking service is attempting to validate (status code "1"+ alternate URL). The link checking service unit determines if the URL corresponds to a file that has been deleted 86. If the mapping table indicates that the file corresponding to the URL has been deleted, a return code of "−1" is returned 88.

If the file is not indicated in the mapping table as being deleted, then the link checking service determines if the mapping table indicates that the file corresponding to the requested URL has been moved 90. If so, a return code of "1" and the alternate URL indicated in the mapping table are returned 92.

If the document corresponding to the URL is not found among the documents being managed by the web server and if there is no entry in the mapping table also for that URL, then that URL is considered to be invalid. This condition can occur as a result of a link correction service sending a request to a link checking service to validate a false hyperlink, or a hyperlink believed to be incorrect. In such a situation the link checking service responds by returning a status code of "−2" 94.

For each link in a document, the link correction service might have to send requests to various link checking services running on different remote web servers, since hyperlinks contained within a document can point to different web servers.

For the purpose of description below assume the following parameters set foryh in Table 1.

TABLE 1

| Domain name of web server: | www.company-name.com |
|---|---|
| Root directory of web server: | / |
| Requested file name: | foo.html |

Web servers today implement the Hypertext Transfer Protocol (http) for communicating requests and responses for web pages between a client and a server. In order to validate a link, the web servers 8, 10 and 12 shown in FIG. 2 are configured to operate according to a new protocol, referred to here as a Hyperlink Validation Protocol (HLVP). The HLVP protocol has the following characteristics.

Figures 5A, 5B:
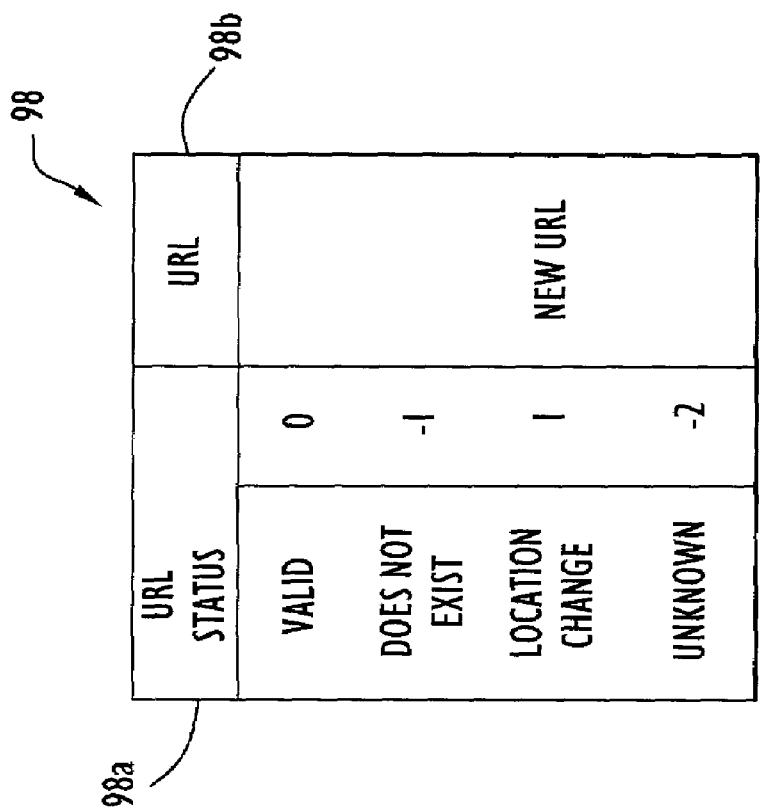
FIGS. 5A and 5B illustrate hyperlink validation protocol (HLVP) request and response messages.

1. A protocol request is URL based, similar to HTTP. To validate the http link http://www.company-name.com/foo.html a client program sends an HLVP request message 96 in the form shown in FIG. 5A, where "hlvp" indicates that the request follows the HLVP protocol, and the URL to be validated is "www.company-name.com/foo.com". Note that the URL for the requested document is exactly the same as in HTTP except for the name of the protocol in the beginning of the URL string ("hlvp" sa opposed to "http").

2. An HLVP protocol response message 98 validates the URL and has the form shown in FIG. 5B. The HLVP response message includes two fields, a URL tatus field 98a and a URL field 98b. The URL status field includes one of the numeric codes shown in FIG. 5B depending on the determined status of the URL. For example, if the URL is determined to be valid, the URL status field of the HLVP response message contains the response code "0". If the location of the URL is determined to be changed, the URL status field of the HLVP response message contains the response code "1" and the URL field contains the new URL identifying the present location of the document.

The link correction service first checks all the web pages stored on the server to determine all the external links in those pages. Then, the link correction service uses the HLVP protocol to validate the links on the web pages. The actions initiated by the link correction service based on the HLVP response is summarized as follows.

1. If an HLVP response for a link on the web page has a URL status code of "0" then that link is valid and the link correction service takes no further action.

2. If an HLVP response for a link on a web page has a URL status code of "−1" then the web page pointed to by the link no longer exists. In that case, the link correction service edits the web page to remove the broken link.

3. If an HLVP response for a link has a URL status code of "1" indicating a change in the location of the file corresponding to the URL, the link correction service edits the web page to change the broken URL to point to the new URL contained in the HLVP response message.

4. If an HLVP response for a link on a web page has a URL status code of "−2" then the link checking service does not know about the requested URL. Accordingly, the resource pointed to by the link is unknown by the remote web server. In that case, the link correction service edits the web page to remove the unknown link.

The systems and techniques described here for fixing broken links do not require modifying client web browsers, but rather are based in the web server. This solution when implemented in a web server configured as described above, allows the web server to autonomously check, validate, and correct the URLs present in the web pages that the web server manages.

Having described embodiments of apparatuses, articles of manufacture and methods of correcting broken hyperlinks, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of correcting links in a document stored on a local server, comprising:

sending a first request from the local server to a link checking service unit of a remote server to determine whether a first resource in the remote server corresponding to a first link in the document is located at said first link;

receiving a first response to said first request from the remote server, the first response containing an indication that the first resource is not located at the first link, wherein the remote server generates the indication by referring to a mapping table stored on the remote server to determine that the first resource is not located at the first link, wherein said mapping table indicates changes that occur in locations of resources on the remote server by storing prior locations of the resources on the remote server, status codes indicating a status of the prior locations, and new locations of the resources on the remote server, said first resource being among said resources;

automatically changing the document in response to the receiving of the first response, based on the indication, wherein said changing of the document comprises automatically replacing the first link or automatically deleting the first link; and automatically sending a second request from the local server to the link checking service unit of the remote server to determine whether a second resource in the remote server corresponding to a second link in the document is located at the second link after the changing of the document, wherein a status code stored in the mapping table in association with the first resource comprises one of a first status code that indicates that the first resource has moved from a prior location stored in the mapping table in association with the first resource to a new location stored in the mapping table in association with the first resource, and a second status code that indicates that the first resource has been permanently removed from the remote server, and wherein a status code stored in the mapping table in association with the second resource comprises a third status code which indicates that the second resource is located at a prior location stored in the mapping table in association with the second resource.

2. The method of claim 1, wherein the response further includes a link status code indicating a status of the first resource.

3. The method of claim 1, wherein the document is a World-Wide Web page and the first link is a hypertext link.

4. The method of claim 1, wherein the first link includes a first uniform resource locator (URL) and the indication includes a second URL, wherein the document is changed by changing the first URL in the first link to the second URL.

5. The method of claim 1, wherein the document is changed by automatically deleting the first link in the document if the first response does not include a replacement link and contains a link status code indicating that the first link is invalid.

6. The method of claim 1, wherein said sending the first request, receiving the first response, and changing the document are performed in a web server.

7. The method of claim 1, wherein the link checking service unit is disposed in a first web server, and the first request is sent from a second web server different from the first web server.

8. The method of claim 1, wherein the automatic changing of the document is performed before a status of any other link in the document is checked.

9. A method for determining a status of links in a document stored on a local server, comprising:

receiving a first request from the local server to determine whether a first resource of a remote server is located at a first link in the document, wherein the first link includes a first location indicator of the first resource;

detecting, by the remote server, if the first resource is present within a storage unit at a location indicated by the first location indicator by referring to a mapping table stored on the remote server, wherein said mapping table indicates changes that occur in locations of resources on the remote server by storing prior locations of the resources on the remote server, status codes indicating a status of the prior locations, and new locations of the resources on the remote server, said first resource being among said resources;

determining, by the remote server, if the first resource is present at an alternate location if the first resource is not detected in the location indicated by the first location indicator by referring to the mapping table;

in response to the first request, returning, by the remote server, an alternate location identifier indicating the alternate location of the first resource if the first resource is determined to be present at the alternate location, wherein the document is automatically changed in response to the returning of the alternate location identifier by automatically replacing the first link with another link comprising the alternate location identifier; and receiving a second request which is automatically sent from the local server after the document is automatically changed, to determine whether a second resource of the remote server is located at a second link in the document, wherein the second link includes a second location indicator of the second resource, wherein a status code stored in the mapping table in association with the first resource comprises a first status code that indicates that the first resource has moved from the location indicated by the first location indicator to the alternate location of the first resource, the location indicated by the first location indicator and the alternate location of the first resource being stored in the mapping table in association with the first resource, and wherein a status code stored in the mapping table in association with the second resource comprises one of a second status code that indicates that the second resource has been permanently removed from the remote server, and a third status code which indicates that the second resource is located at a location indicated by the second location indicator which is stored in the mapping table in association with the second resource.

10. The method of claim 9, wherein the first link is a hypertext link and the location indicator of the resource is a uniform resource locator (URL).

11. The method of claim 10, wherein the first resource is a web page.

12. The method of claim 10, further comprising returning a link status code indicating whether the first resource is present in the storage unit.

13. The method of claim 12, wherein the link status code indicates whether the first resource has been deleted from the storage unit.

14. The method of claim 9, wherein the first and second location indicators are uniform resource locators (URLs).

15. The method of claim 9, wherein the first request is received by a first web server, and the alternate location identifier is returned to a second web server different from the first web server.

16. The method of claim 9, wherein the automatic changing of the document is performed before a status of any other link in the document is checked.

17. A system for correcting links to resources in a network, comprising:
a remote web server comprising a link checking service unit; and
a local web server comprising a link correction service unit,
wherein said link correction service unit sends a first request from the local server to the link checking service unit to determine whether a first resource in the remote server corresponding to a first link in a document stored on the local server is located at said first link, wherein the link checking service unit of the remote server sends a first response to said first request to the link correction service unit, the first response containing an indication that the first resource is not located at the first link, wherein the link checking service unit of the remote server generates the indication by referring to a mapping table stored on the remote server to determine that the first resource is not located at the first link, wherein said mapping table indicates changes that occur in locations of resources on the remote server by storing prior locations of the resources on the remote server, status codes indicating a status of the prior locations, and new locations of the resources on the remote server, said first resource being among said resources, wherein the link correction service unit automatically changes the document in response to the receiving of the first response, based on the indication, wherein said changing of the document comprises automatically replacing the first link or automatically deleting the first link;

wherein the link correction service unit automatically sends a second request from the local server to the link checking service unit of the remote server to determine whether a second resource in the remote server corresponding to a second link in the document is located at the second link after the changing of the document, wherein a status code stored in the mapping table in association with the first resource comprises one of a first status code that indicates that the first resource has moved from a prior location stored in the mapping table in association with the first resource to a new location stored in the mapping table in association with the first resource, and a second status code that indicates that the first resource has been permanently removed from the remote server, and wherein a status code stored in the mapping table in association with the second resource comprises a third status code which indicates that the second resource is located at a prior location stored in the mapping table in association with the second resource.

18. The system of claim 17, wherein said document is a World-Wide Web page, and said link is a hypertext link.

19. An apparatus for correcting a link in a document, comprising:
a document repository having stored therein one or more documents;
a corrected document repository having stored therein one or more corrected documents; and
a link correction service unit connected to the document repository and the corrected document repository, and configured to correct link in a document among the one or more documents in the document repository,
wherein the link correction service unit:
sends a first request from a local server on which the link correction service is disposed to a link checking service unit of a remote server to determine whether a first resource in the remote server corresponding to a first link in the document is located at said first link;
receives a first response to said first request from the remote server, the first response containing an indication that the first resource is not located at the first link, wherein the remote server generates the indication by referring to a mapping table stored on the remote server to determine that the first resource is not located at the first link, wherein said mapping table indicates changes that occur in locations of resources on the remote server by storing prior locations of the resources on the remote server, status codes indicating a status of the prior locations, and new locations of the resources on the remote server, said first resource being among said resources;

automatically changes the document in response to the receiving of the first response, based on the indication, wherein said changing of the document comprises automatically replacing the first link or automatically deleting the first link;

automatically sends a second request from the local server to the link checking service unit of the remote server to determine whether a second resource in the remote server corresponding to a second link in the document is located at the second link after the changing of the document; and stores a corrected document having the replaced first link in the corrected document repository, wherein a status code stored in the mapping table in association with the first resource comprises one of a first status code that indicates that the first resource has moved from a prior location stored in the mapping table in association with the first resource to a new location stored in the mapping table in association with the first resource, and a second status code that indicates that the first resource has been permanently removed from the remote server, and wherein a status code stored in the mapping table in association with the second resource comprises a third status code which indicates that the second resource is located at a prior location stored in the mapping table in association with the second resource.

20. The apparatus of claim 19, wherein the link is a hypertext link containing a uniform resource locator (URL) and the document is a web page.

21. An apparatus for correcting a link in a document stored on a local sever, comprising:

a processor means for sending, using the processor, a first request from the local server to a link checking service unit of a remote server to determine whether a first resource in the remote server corresponding to a first link in the document is located at said first link;

means for receiving a first response to said first request from the remote server, the first response containing an indication that the first resource is not located at the first link, wherein the remote server generates the indication by referring to a mapping table stored on the remote server to determine that the first resource is not located at the first link, wherein said mapping table indicates changes that occur in locations of resources on the remote server by storing prior locations of the resources on the remote server, status codes indicating a status of the prior locations, and new locations of the resources on the remote server, said first resource being among said resources;

means for automatically changing the document in response to the receiving of the first response, based on the indication, wherein said changing of the document comprises automatically replacing the first link or automatically deleting the first link; and means for automatically sending a second request from the local server to the link checking service unit of the remote server to determine whether a second resource in the remote server corresponding to a second link in the document is located at the second link after the changing of the document, wherein a status code stored in the mapping table in association with the first resource comprises one of a first status code that indicates that the first resource has moved from a prior location stored in the mapping table in association with the first resource to a new location stored in the mapping table in association with the first resource, and a second status code that indicates that the first resource has been permanently removed from the remote server, and wherein a status code stored in the mapping table in association with the second resource comprises a third status code which indicates that the second resource is located at a prior location stored in the mapping table in association with the second resource.

22. A computer readable medium having embodied thereon program instructions suitable for execution by a computer, the program instructions comprising:

program instructions for sending a first request from a local server on which a document is stored to a link checking service unit of a remote server to determine whether a first resource in the remote server corresponding to a first link in the document is located at said first link;

program instructions for receiving a first response to said first request from the remote server, the first response containing an indication that the first resource is not located at the first link, wherein the remote server generates the indication by referring to a mapping table stored on the remote server to determine that the first resource is not located at the first link, wherein said mapping table indicates changes that occur in locations of resources on the remote server by storing prior locations of the resources on the remote server, status codes indicating a status of the prior locations, and new locations of the resources on the remote server, said first resource being among said resources;

program instructions for automatically changing the document in response to the receiving of the first response, based on the indication, wherein said changing of the document comprises automatically replacing the first link or automatically deleting the first link; and program instructions for automatically sending a second request from the local server to the link checking service unit of the remote server to determine whether a second resource in the remote sewer corresponding to a second link in the document is located at the second link after the changing of the document, wherein a status code stored in the mapping table in association with the first resource comprises one of a first status code that indicates that the first resource has moved from a prior location stored in the mapping table in association with the first resource to a new location stored in the mapping table in association with the first resource, and a second status code that indicates that the first resource has been permanently removed from the remote server, and wherein a status code stored in the mapping table in association with the second resource comprises a third status code which indicates that the second resource is located at a prior location stored in the mapping table in association with the second resource.

23. An apparatus for correcting a link in a document stored on a local server, comprising:

a document repository having stored therein one or more documents on a remote server;

a mapping table unit stores prior locations of resources on the remote server, status codes indicating a status of the prior locations, and new locations of the resources on the remote server; and a link checking service unit connected to the document repository and the mapping table unit, and configured to:

receive a first request from the local server to determine whether the first resource is located at a first link in the document, wherein the first link includes the first prior resource-locator of the first resource;

detect if the first resource is present within the document repository at a location indicated by the first prior resource-locator by referring to the mapping table unit;

determine if the first resource is present at an alternate location if the first resource is not detected in the location indicated by the first prior resource-locator by referring to the mapping table unit;

in response to the first request, return the first present resource-locator indicating the alternate location of the first resource if the first resource is determined to be present at the alternate location, wherein the document is automatically changed in response to the returning of the alternate location identifier by automatically replacing the first link with another link comprising the first present resource-locator; and receive a second request which is automatically sent from the local server after the document is automatically changed, to determine whether a second resource of the remote server is located at a second link in the document, wherein the second link includes a second location indicator of the second resource, wherein a status code stored in the mapping table in association with the first resource comprises a first status code that indicates that the first resource has moved from the location indicated by the first location indicator to the alternate location of the first resource, the location indicated by the first location indicator and the alternate location of the first resource being stored in the mapping table in association with the first resource, and wherein a status code stored in the mapping table in association with the second resource comprises one of a second status code that indicates that the second resource has been permanently removed from the remote server, and a third status code which indicates that the second resource is located at a location indicated by the second location indicator which is stored in the mapping table in association with the second resource.

24. The apparatus of claim 23, wherein the first prior and first present resource-locators are uniform resource locators (URLs).

25. The apparatus of claim 23, wherein the mapping table further includes a second prior resource-locator indicating a location of the second resource and a status code indicating a status of the second prior resource-locator.

26. The apparatus of claim 25, wherein the status code indicates that the second resource corresponding to the second prior resource-locator has been deleted.

27. The apparatus of claim 25, wherein the status code indicates that the second prior resource-locator indicates a present location of the second resource in the document repository.

28. An apparatus for determining a status of a link in a document stored on a local server, comprising:

a processor, means for receiving, using the processor, a first request from the local server to determine whether a first resource of a remote server is located at a first link in the document, wherein the first link includes a first location indicator of the first resource;

means for detecting, by the remote server, if the first resource is present within a storage unit at a location indicated by the first location indicator by referring to a mapping table stored on the remote server, wherein said mapping table indicates changes that occur in locations of resources on the remote server by storing prior locations of the resources on the remote server, status codes indicating a status of the prior locations, and new locations of the resources on the remote server, said first resource being among said resources;

means for determining, by the remote sewer, if the first resource is present at an alternate location if the first resource is not detected in the location indicated by the first location indicator by referring to the mapping table;

means for returning, by the remote sewer, in response to the first request, an alternate location identifier indicating the alternate location of the first resource if the first resource is determined to be present at the alternate location, wherein the document is automatically changed in response to the returning of the alternate location identifier by automatically replacing the first link with another link comprising the alternate location identifier; and means for receiving a second request which is automatically sent from the local server after the document is automatically changed, to determine whether a second resource of the remote server is located at a second link in the document, wherein the second link includes a second location indicator of the second resource, wherein a status code stored in the mapping table in association with the first resource comprises a first status code that indicates that the first resource has moved from the location indicated by the first location indicator to the alternate location of the first resource, the location indicated by the first location indicator and the alternate location of the first resource being stored in the mapping table in association with the first resource, and wherein a status code stored in the mapping table in association with the second resource comprises one of a second status code that indicates that the second resource has been permanently removed from the remote server, and a third status code which indicates that the second resource is located at a location indicated by the second location indicator which is stored in the mapping table in association with the second resource.

29. A computer readable medium having embodied thereon program instructions suitable for execution on a computer for determining a status of a link in a document stored on a local server, the program instructions comprising:

program instructions for receiving a first request from the local server to determine whether a first resource of a remote server is located at a first link in the document, wherein the first link includes a first location indicator of the first resource;

program instructions for detecting, by the remote server, if the first resource is present within a storage unit at a location indicated by the first location indicator by referring to a mapping table stored on the remote server, wherein said mapping table indicates changes that occur in locations of resources on the remote server by storing prior locations of the resources on the remote server, status codes indicating a status of the prior locations, and new locations of the resources on the remote server, said first resource being among said resources;

program instructions for determining, by the remote server, if the first resource is present at an alternate location if the first resource is not detected in the location indicated by the first location indicator by referring to the mapping table;

program instructions for returning, by the remote server, in response to the first request, an alternate location identifier indicating the alternate location of the first resource if the first resource is determined to be present at the alternate location, wherein the document is automatically changed in response to the returning of the alternate location identifier by automatically replacing the first link with another link comprising the alternate location identifier; and program instructions for receiving a second request which is automatically sent from the local server after the document is automatically changed, to determine whether a second resource of the remote server is located at a second link in the document, wherein the second link includes a second location indicator of the second resource, wherein a status code stored in the mapping table in association with the first resource comprises a first status code that indicates that the first resource has moved from the location indicated by the first location indicator to the alternate location of the first resource, the location indicated by the first location indicator and the alternate location of the first resource being stored in the mapping table in association with the first resource, and wherein a status code stored in the mapping table in association with the second resource comprises one of a second status code that indicates that the second resource has been permanently removed from the remote server, and a third status code which indicates that the second resource is located at a location indicated by the second location indicator which is stored in the mapping table in association with the second resource.

* * * * *